US011874624B2

(12) United States Patent
Ichikawa

(10) Patent No.: US 11,874,624 B2
(45) Date of Patent: Jan. 16, 2024

(54) CARTRIDGE FOR FOIL TRANSFER DEVICE AND HOLDER

(71) Applicant: BROTHER KOGYO KABUSHIKI KAISHA, Nagoya (JP)

(72) Inventor: Tomoya Ichikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/844,446

(22) Filed: Jun. 20, 2022

(65) Prior Publication Data

US 2022/0413429 A1 Dec. 29, 2022

(30) Foreign Application Priority Data

Jun. 24, 2021 (JP) ................................ 2021-104535

(51) Int. Cl.
*G03G 21/16* (2006.01)
*B41F 16/00* (2006.01)
*G03G 15/00* (2006.01)
*B41J 2/325* (2006.01)

(52) U.S. Cl.
CPC ..... *G03G 21/1647* (2013.01); *B41F 16/0006* (2013.01); *B41F 16/006* (2013.01); *B41J 2/325* (2013.01); *G03G 15/6591* (2013.01); *G03G 21/168* (2013.01)

(58) Field of Classification Search
CPC ............ G03G 15/221; G03G 15/6582; G03G 15/6591; G03G 21/1647; G03G 21/168; G03G 2215/00493; G03G 2215/00801; B41F 16/0006; B41F 16/006; B41J 2/325; B41J 17/30
See application file for complete search history.

(56) References Cited

U.S. PATENT DOCUMENTS

2019/0094767 A1* 3/2019 Sakai ................. G03G 15/2042
2021/0349413 A1* 11/2021 Hiramatsu ............... B41J 2/325

FOREIGN PATENT DOCUMENTS

JP 2019-171611 A 10/2019

* cited by examiner

*Primary Examiner* — Sophia S Chen
(74) *Attorney, Agent, or Firm* — Baker Botts L.L.P.

(57) ABSTRACT

A cartridge is attachable to and detachable from a housing main body of a foil transfer device that disposes a multilayer film including a plurality of layers on a sheet and transfers at least one layer of the multilayer film onto the sheet. The cartridge includes a feed reel around which the multilayer film is rolled and that is configured to rotate about a first axis extending in an axial direction of the feed reel, a reel gear that is located at an end portion of the feed reel in the axial direction and that is configured to rotate together with the feed reel, an output gear that transmits a rotational force applied to the feed reel to outside of the cartridge, and an intermediate gear that reduces rotation speed of the reel gear and transmits the rotation of the reel gear to the output gear.

20 Claims, 9 Drawing Sheets

CARTRIDGE FOR FOIL TRANSFER DEVICE AND HOLDER

REFERENCE TO RELATED APPLICATIONS

This present application claims priority from Japanese Patent Application No. 2021-104535 filed on Jun. 24, 2021. The entire contents of the priority application are incorporated herein by reference.

BACKGROUND ART

The present invention relates to a cartridge attachable to and detachable from a housing main body of a foil transfer device, and a holder that holds the cartridge.

In related art, as a foil transfer device, there is known a foil transfer device including a feed reel around which a multilayer film containing a foil is rolled, a roll-up reel that rolls up the multilayer film, a heating roller that heats the multilayer film and a sheet, and a pressure roller that sandwiches the multilayer film and the sheet with the heating roller. In the related art, in order to make a tension acting per unit width constant even in a case where a width of the film is different, a rotational speed of an output gear is made different according to the width of the film.

In a configuration according to the related art, a cartridge mounted on a housing main body of the foil transfer device includes a two-stage gear having two gears having different diameters at end portions in an axial direction. In the two-stage gear, only one is used and the other is not used according to a width of the multilayer film, resulting in an increase in size of the cartridge in the axial direction.

Therefore, an object of the present invention is to set a tension applied to a multilayer film per unit width within a certain range without increasing a size of a cartridge in an axial direction.

DESCRIPTION

A cartridge according to the present invention is attachable to and detachable from a housing main body of a foil transfer device that disposes a multilayer film including a plurality of layers on a sheet and transfers at least one layer of the multilayer film onto a toner image. The cartridge includes: a feed reel around which the multilayer film is rolled and that is configured to rotate about a first axis extending in an axial direction; a reel gear that is located at an end portion of the feed reel in the axial direction and that is configured to rotate together with the feed reel; an output gear that transmits a rotational force to outside of the cartridge; and at least one intermediate gear that reduces rotation speed of the reel gear and transmits the rotation to the output gear.

According to this configuration, since the rotation speed of the reel gear may be reduced and the rotation may be transmitted to the output gear according to a film width of the cartridge, a tension acting per unit width may be within a certain range even in a case where the film width of the cartridge is different. Since it is not necessary to provide a gear that is not used at an end portion in the axial direction, it is possible to prevent an increase in size of the cartridge in the axial direction.

In the above-described configuration, both the output gear and the reel gear may rotate about the first axis.

In the above-described configuration, the at least one intermediate gear may include a first intermediate gear including a first large-diameter gear that meshes with the reel gear and a first small-diameter gear that rotates together with the first large-diameter gear, and a second intermediate gear including a second large-diameter gear that meshes with the first small-diameter gear and a second small-diameter gear that rotates together with the second large-diameter gear and meshes with the output gear.

In the above-described configuration, the cartridge may include a side wall that rotatably supports the feed reel, and in the axial direction, the reel gear may be located on one side of the side wall, and the output gear may be located on the other side of the side wall.

In the above-described configuration, the side wall may have a through hole, and the first intermediate gear may mesh with the reel gear via the through hole.

In the above-described configuration, the cartridge may be mountable on a holder to be mounted on the housing main body in a state in which the cartridge is held, and the holder may include an input gear that meshes with the output gear in a case where the cartridge is mounted, and a torque applying member that applies resistance to rotation of the input gear.

According to this configuration, since the holder includes the torque applying member, resistance may be applied from the input gear to the output gear of the cartridge.

In the above-described configuration, the holder may further include a rotational speed detector configured to detect a rotational speed of the input gear.

In the above-described configuration, the rotational speed detector may be a rotary encoder.

In the above-described configuration, the rotary encoder may rotate about the first axis.

In the above-described configuration, on the holder, the above-described cartridge in which the multilayer film having a first width is rolled around the feed reel, and a second cartridge including a second feed reel around which a multilayer film having a second width larger than the first width is rolled, may be selectively mountable.

In the above-described configuration, the second cartridge may include a second output gear that is located at an end portion of the second feed reel and rotates together with the second feed reel, the second output gear meshing with the input gear.

A holder according to the present invention for solving the above matters is configured to hold a cartridge, the cartridge being attachable to and detachable from a housing main body of a foil transfer device that disposes a multilayer film including a plurality of layers on a surface of a sheet on which a toner image is formed and transfers at least one layer of the multilayer film onto the toner image, the cartridge including: a feed reel around which the multilayer film is rolled and that rotates about a first axis extending in an axial direction; a reel gear that is located at an end portion of the feed reel in the axial direction and rotates together with the feed reel; an output gear; and at least one intermediate gear that reduces rotation speed of the reel gear and transmits the rotation to the output gear. The holder includes: an input gear that meshes with the output gear in a case where the cartridge is mounted; and a torque applying member that applies resistance to rotation of the input gear.

According to this configuration, since the rotation speed of the reel gear may be reduced and the rotation may be transmitted to the output gear according to a film width of the cartridge, a tension acting on the multilayer film per unit width may be within a certain range even in a case where a width of the multilayer film of the cartridge is different.

In the above-described configuration, the holder may further include a rotational speed detector configured to detect a rotational speed of the input gear.

In the above-described configuration, the rotational speed detector may be a rotary encoder.

In the above-described configuration, the rotary encoder may rotate about the first axis.

In the above-described configuration, the cartridge in which the multilayer film having a first width is rolled around the feed reel, and a second cartridge including a second feed reel around which a multilayer film having a second width larger than the first width is rolled, may be selectively mountable.

In the above-described configuration, the second cartridge may include a second output gear that is located at an end portion of the second feed reel and rotates together with the second feed reel, the second output gear meshing with the input gear.

According to the present invention, a tension applied to a multilayer film of a cartridge may be within a certain range without increasing a size of the cartridge in a width direction of the multilayer film.

DESCRIPTION OF EMBODIMENTS

Figure 1A:
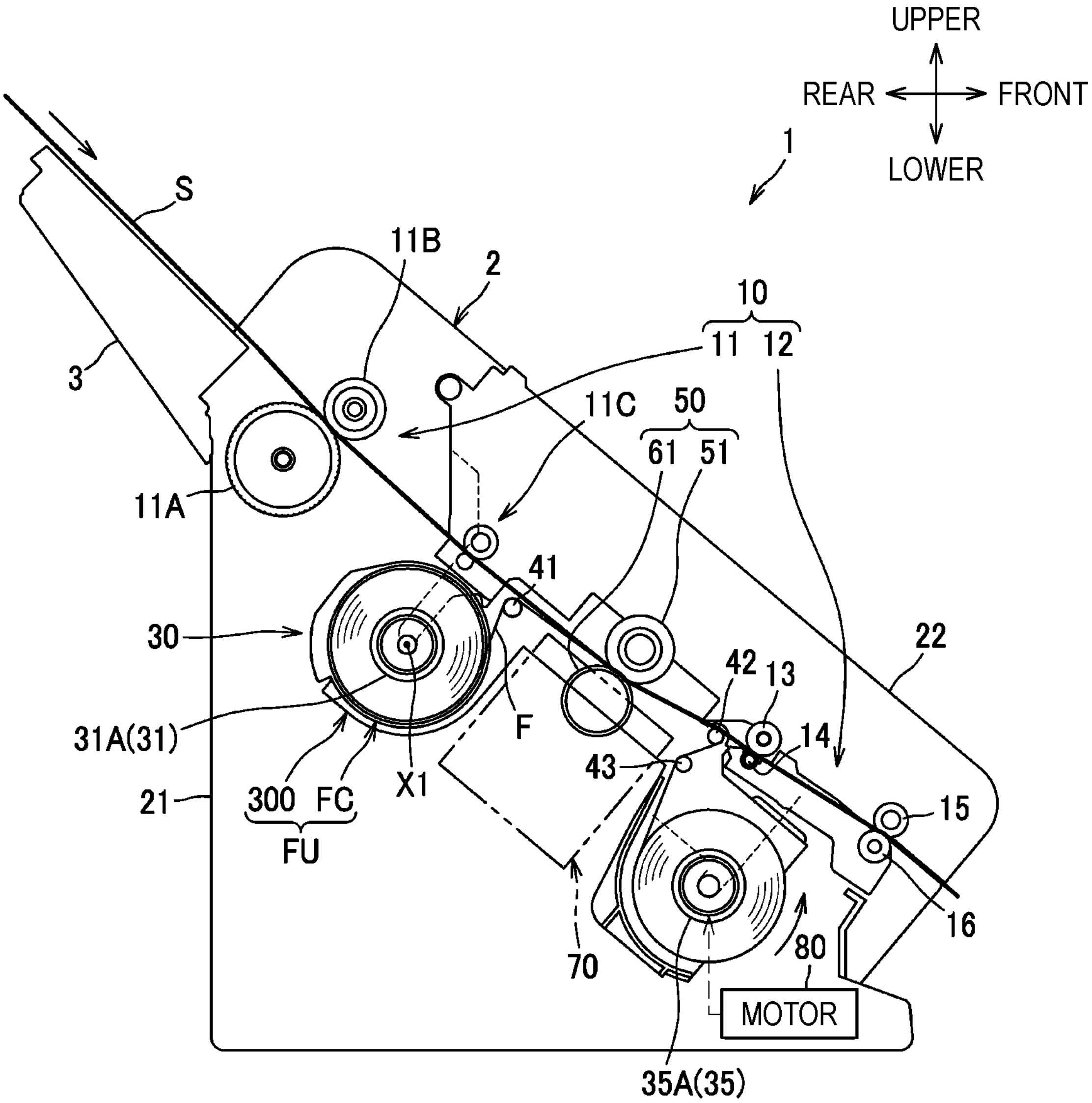
FIG. 1A is a view showing a foil transfer device according to an embodiment of the present invention.

An embodiment of the present invention will be described in detail with reference to the drawings as appropriate. In the following description, directions will be described as directions shown in FIG. 1A. That is, a right side in FIG. 1A is referred to as "front", a left side in FIG. 1A is referred to as "rear", a front side of paper of FIG. 1A is referred to as "left", and a back side of the paper of FIG. 1A is referred to as "right". In addition, upper and lower sides in FIG. 1A are referred to as "upper and lower".

A foil transfer device 1 is a device that disposes a multilayer film F formed of a plurality of layers containing a foil on the sheet S and transfers the foil onto the sheet S. As shown in FIG. 1A, the foil transfer device 1 is a device that transfers a foil such as aluminum onto a toner image formed on the sheet S by an image forming device such as a laser printer. The foil transfer device 1 includes a housing 2, a sheet tray 3, a sheet conveyance unit 10, a film feed unit 30, and a transfer unit 50.

The housing 2 is made of resin or the like, and includes a housing main body 21 and a cover 22. The housing main body 21 has an opening 21A in an upper portion thereof (see FIG. 2). The opening 21A is an opening for attaching and detaching a film unit FU to be described later to and from the housing main body 21. The opening 21A faces upward. The cover 22 is a member that opens and closes the opening 21A. A rear end portion of the cover 22 is rotatably supported by the housing main body 21. The cover 22 is movable between a closed position where the opening 21A is closed and an open position where the opening 21A is opened. In the present embodiment, the cover 22 opens in a direction different from a conveyance direction of the sheet S.

The sheet tray 3 is a tray on which the sheet S such as a sheet or an OHP film is placed. The sheet tray 3 is provided at a rear portion of the housing 2. The sheet S is placed on the sheet tray 3 with a surface on which the toner image is formed facing downward.

The sheet conveyance unit 10 includes a sheet feed mechanism 11 and a sheet discharge mechanism 12. The sheet feed mechanism 11 is a mechanism that conveys the sheets S on the sheet tray 3 one by one toward the transfer unit 50. The sheet feed mechanism 11 includes a pickup roller 11A, a retard roller 11B, and an upstream side conveyance roller 11C.

The pickup roller 11A is a roller that feeds the sheets S on the sheet tray 3 toward the transfer unit 50. The retard roller 11B is a roller that separates the sheets S conveyed by the pickup roller 11A into one sheet.

The retard roller 11B is disposed on the pickup roller 11A. The retard roller 11B is rotatable in a direction in which the sheet S overlapped on the sheet S fed by the pickup roller 11A is returned toward the sheet tray 3.

The upstream side conveyance roller 11C includes two rollers, and may convey the sheet S by rotating each roller in a state in which the sheet S is sandwiched between these rollers. The upstream side conveyance roller 11C is disposed between the pickup roller 11A and the transfer unit 50, and conveys the sheet S fed by the pickup roller 11A to the transfer unit 50.

The sheet discharge mechanism 12 is a mechanism that discharges the sheet S that has passed through the transfer unit 50 to outside of the housing 2. The sheet discharge mechanism 12 includes a first conveyance roller 13, a second conveyance roller 14, a third conveyance roller 15, and a fourth conveyance roller 16. The first conveyance roller 13, the second conveyance roller 14, the third conveyance roller 15, and the fourth conveyance roller 16 are provided on the cover 22.

The film feed unit 30 is a portion that feeds the multilayer film F so as to overlap the sheet S conveyed from the sheet feed mechanism 11. The film feed unit 30 includes the film unit FU and a motor 80.

Figure 2:
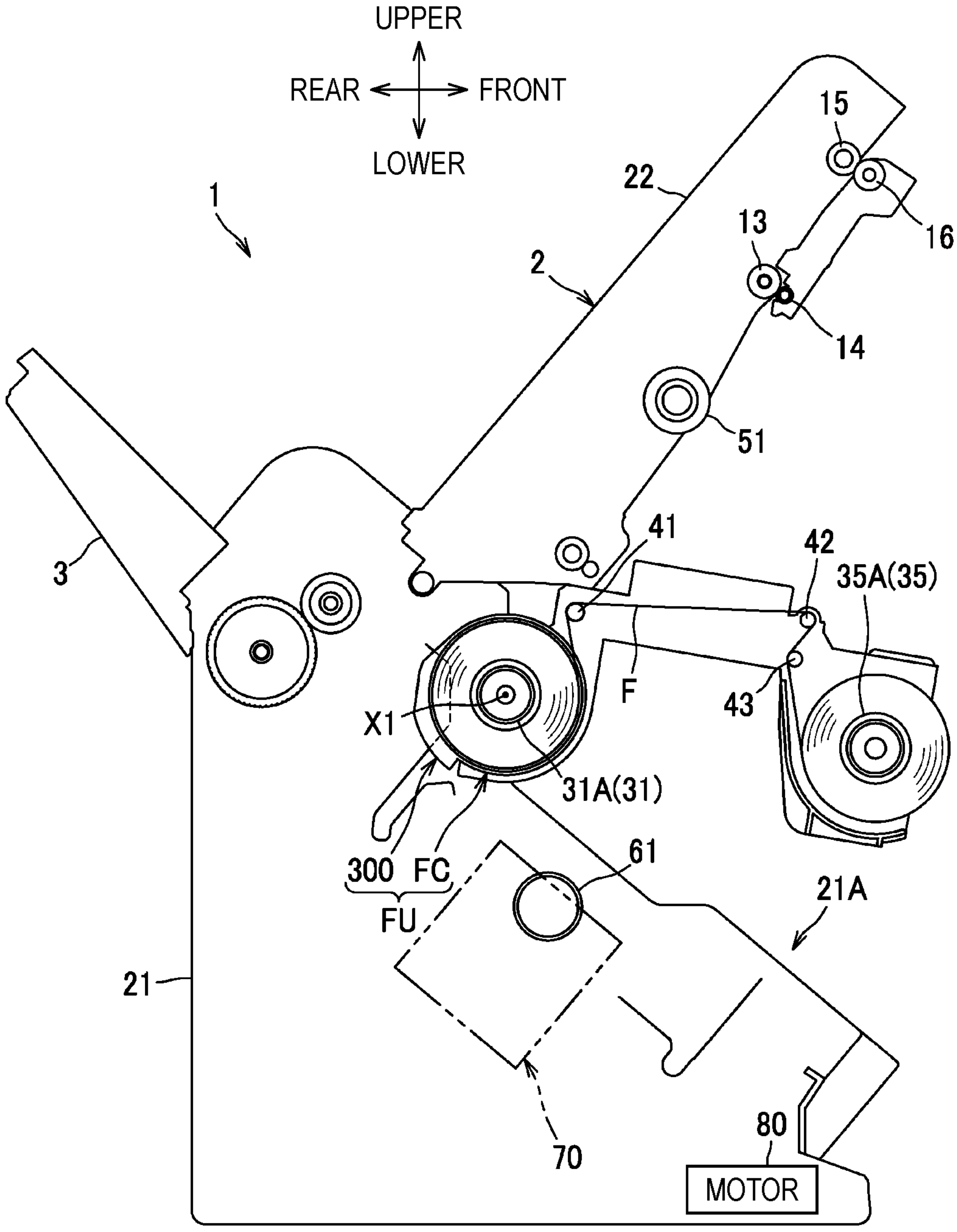
FIG. 2 is a view showing a state in which a cover of the foil transfer device is opened.

The film unit FU includes a film cartridge FC that holds the multilayer film F and a holder 300 that holds the film cartridge FC. As shown in FIG. 2, the film unit FU is attachable to and detachable from the housing main body 21 from above. That is, the film cartridge FC is mounted on the housing main body 21 in a state of being held by the holder 300.

Figure 6:
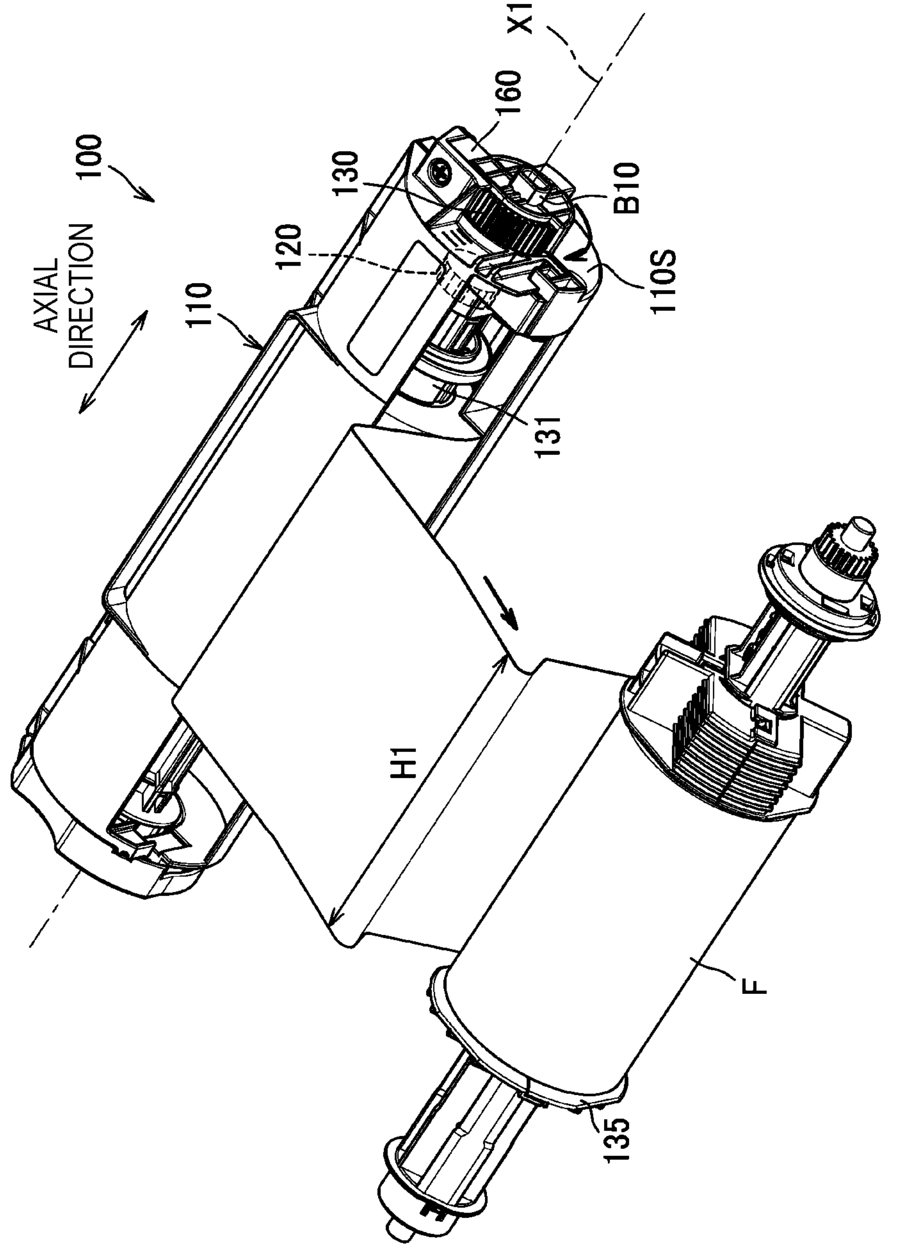
FIG. 6 is a perspective view of a cartridge.
Figure 7:
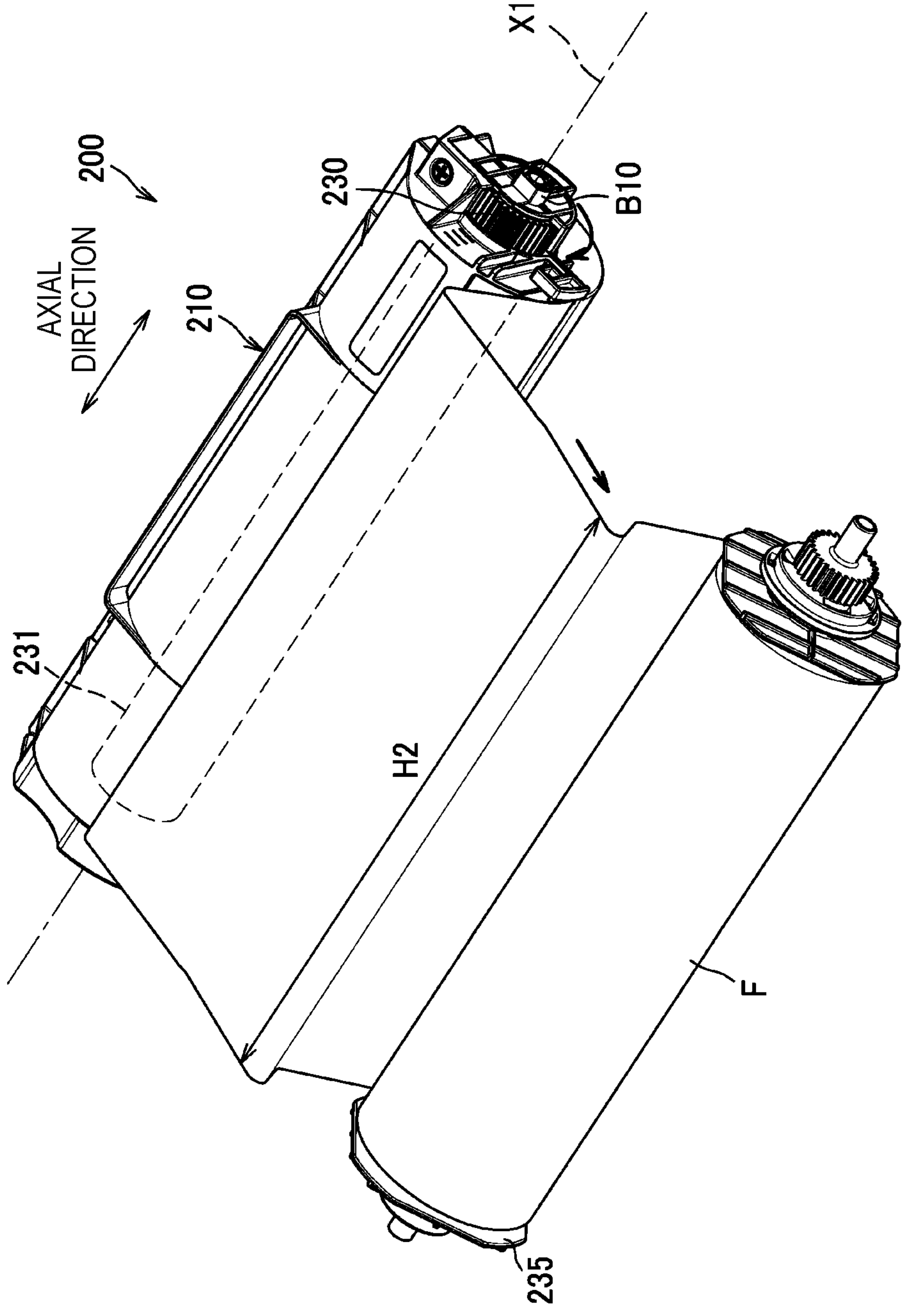
FIG. 7 is a perspective view of a second cartridge.

In the present embodiment, on the housing main body 21 of the foil transfer device 1, a cartridge 100 in which the multilayer film F having a first width H1 is rolled as shown in FIG. 6, and a second cartridge 200 in which the multilayer film F having a second width H2 larger than the first width H1 is rolled as shown in FIG. 7, may be selectively mounted. That is, the film cartridge FC includes the cartridge 100 and the second cartridge 200.

Figure 1B:
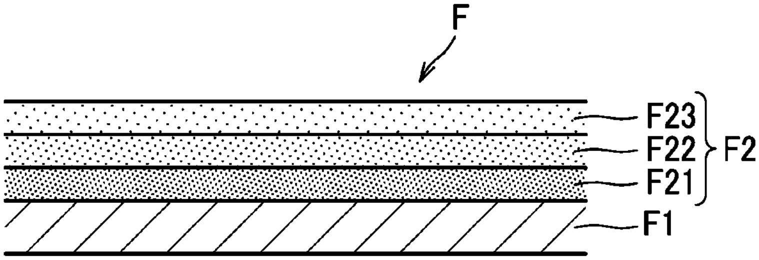
FIG. 1B is a cross-sectional view showing a configuration of a multilayer film.

As shown in FIG. 1B, the multilayer film F includes a support layer F1 and a supported layer F2. The support layer F1 is a tape-shaped transparent base material made of a polymer material, and supports the supported layer F2.

The supported layer F2 includes a release layer F21, a transfer layer F22, and an adhesive layer F23. The release layer F21 is a layer for facilitating release of the transfer layer F22 from the support layer F1, and is disposed between the support layer F1 and the transfer layer F22. The release layer F21 contains a transparent material that is easily released from the support layer F1, for example, a wax-based resin.

The transfer layer F22 is a layer to be transferred onto the toner image, and contains a foil. The foil is a thin metal such as gold, silver, copper, or aluminum. The transfer layer F22 contains a coloring material such as gold, silver, or red, and a thermoplastic resin. The transfer layer F22 is disposed between the release layer F21 and the adhesive layer F23.

The adhesive layer F23 is a layer for facilitating adhesion of the transfer layer F22 to the toner image. The adhesive layer F23 contains a material that easily adheres to the toner image heated by the transfer unit 50 to be described later, for example, a vinyl chloride resin or an acrylic resin.

As shown in FIG. 1A, the holder 300 includes a first guide shaft 41, a second guide shaft 42, and a third guide shaft 43.

The first guide shaft 41, the second guide shaft 42, and the third guide shaft 43 are roller-shaped shafts for changing a traveling direction of the multilayer film F. The first guide shaft 41, the second guide shaft 42, and the third guide shaft 43 are made of stainless steel (SUS) or the like.

The first guide shaft 41 is located upstream of the transfer unit 50 in the conveyance direction of the sheet S. The first guide shaft 41 changes the traveling direction of the multilayer film F drawn out from a feed reel 31 so as to be substantially parallel to the conveyance direction of the sheet S.

The multilayer film F guided by such a first guide shaft 41 is conveyed toward the transfer unit 50 with the supported layer F2 (see FIG. 1B) facing upward. The sheet S is overlapped on the multilayer film F in a state in which the supported layer F2 faces upward, and is conveyed toward the transfer unit 50 together with the multilayer film F.

The second guide shaft 42 is located downstream of the transfer unit 50 in the conveyance direction of the sheet S. The second guide shaft 42 releases the multilayer film F from the sheet S by changing the traveling direction of the multilayer film F that has passed through the transfer unit 50 to a direction different from the conveyance direction of the sheet S.

The third guide shaft 43 is a member that defines the traveling direction of the multilayer film F changed by the second guide shaft 42. Specifically, the third guide shaft 43 defines an angle of the multilayer film F in a case where the multilayer film F is released from the sheet S.

Figure 3:
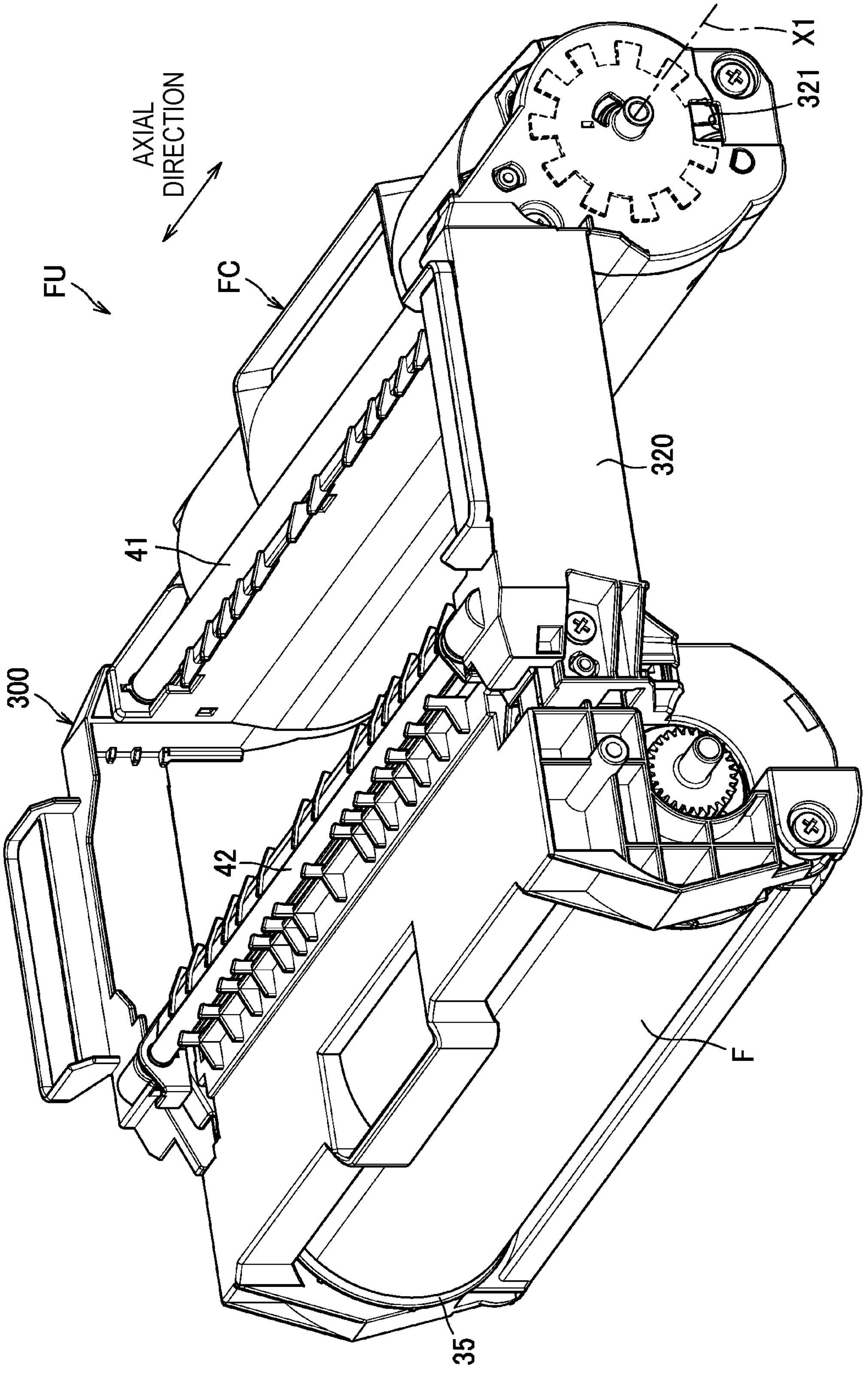
FIG. 3 is a perspective view of a holder holding a film cartridge.

The film cartridge FC includes the feed reel 31 around which the multilayer film F is rolled, and a roll-up reel 35 that rolls up the used multilayer film F. The feed reel 31, around which the multilayer film F is rolled, rotates about a first axis X1 extending in an axial direction (see FIG. 3). The feed reel 31 is made of resin or the like, and includes a feed shaft portion 31A around which the multilayer film F is rolled. The roll-up reel 35 is made of resin or the like, and includes a roll-up shaft portion 35A that rolls up the multilayer film F.

In a state in which the film unit FU is mounted on the foil transfer device 1, the roll-up reel 35 is rotationally driven in a counterclockwise direction in the drawing by the motor 80 provided in the housing 2. In a case where the roll-up reel 35 rotates, the multilayer film F rolled around the feed reel 31 is drawn out, and the drawn out multilayer film F is guided by the guide shafts 41 to 43 and rolled up by the roll-up reel 35. Specifically, during foil transfer, the multilayer film F is fed out by a pressure roller 51 and a heating roller 61 to be described later, so that the multilayer film F is drawn out from the feed reel 31. Then, the multilayer film F fed out from the pressure roller 51 and the heating roller 61 is rolled up by the roll-up reel 35.

The transfer unit 50 is a portion that transfers the transfer layer F22 onto the toner image formed on the sheet S by heating and pressing the sheet S and the multilayer film F in an overlapped state. The transfer unit 50 includes the pressure roller 51 and the heating roller 61. The transfer unit 50 heats and presses the sheet S and the multilayer film F in an overlapped manner at a nip portion between the pressure roller 51 and the heating roller 61.

The pressure roller 51 is a roller in which a cylindrical metal insert is covered with a rubber layer made of silicon rubber. The pressure roller 51 is disposed on an upper side of the multilayer film F and is capable of coming into contact with a back surface of the sheet S (a surface opposite to a front surface on which the toner image is formed).

Both end portions of the pressure roller 51 are rotatably supported by the cover 22. The pressure roller 51 sandwiches the sheet S and the multilayer film F with the heating roller 61, and is driven to rotate by the motor 80 to rotate the heating roller 61.

The heating roller 61 is a roller in which a heater is disposed inside a metal tube formed in a cylindrical shape, and heats the multilayer film F and the sheet S. The heating roller 61 is disposed below the multilayer film F and is in contact with the multilayer film F. The heating roller 61 heats the multilayer film F and the sheet S.

In the present embodiment, the heating roller 61 is moved by a contact and separation mechanism 70 that brings the heating roller 61 into contact with and separates the heating roller 61 from the multilayer film F. The contact and separation mechanism 70 is disposed between the feed reel 31 and the roll-up reel 35 in the conveyance direction of the sheet S. In a case where the cover 22 is closed, the contact and separation mechanism 70 moves the heating roller 61 to a contact position where the heating roller 61 comes into contact with the multilayer film F in accordance with a timing at which the sheet S is fed to the transfer unit 50. In a case where the cover 22 is opened or in a case where foil transfer is not performed on the sheet S in the transfer unit 50, the contact and separation mechanism 70 positions the heating roller 61 at a separation position where the heating roller 61 is separated from the multilayer film F.

In the foil transfer device 1 configured as described above, the sheet S placed on the sheet tray 3 with the front surface of the sheet S facing downward is conveyed toward the transfer unit 50 by the sheet feed mechanism 11. The sheet S is overlapped on the multilayer film F fed from the feed reel 31 on an upstream side of the transfer unit 50 in the conveyance direction, and is conveyed to the transfer unit 50 in a state in which the toner image of the sheet S and the multilayer film F are in contact with each other.

In the transfer unit 50, in a case where the sheet S and the multilayer film F pass through the nip portion between the pressure roller 51 and the heating roller 61, the sheet S and the multilayer film F are heated and pressed by the heating roller 61 and the pressure roller 51, and the foil (supported layer F2) is transferred onto the toner image.

After the foil is transferred, the sheet S and the multilayer film F are conveyed to the second guide shaft 42 in a state in which the sheet S and the multilayer film F are adhered to each other. In a case where the sheet S and the multilayer film F pass through the second guide shaft 42, the traveling direction of the multilayer film F is changed to a direction different from the conveyance direction of the sheet S. Therefore, the multilayer film F is released from the sheet S, that is, the supported layer F2 adhered to the toner image is released from the support layer F1 of the multilayer film F.

The multilayer film F including the support layer F1 released from the sheet S and released from the supported layer F2 adhered to the toner image on the sheet S is rolled around the roll-up reel 35. On the other hand, the sheet S from which the multilayer film F has been released is discharged to the outside of the housing 2 by the sheet discharge mechanism 12 in a state in which the front surface onto which the foil has been transferred faces downward.

As described above, in a case where the roll-up reel 35 is rotationally driven by the motor 80, the multilayer film F rolled around the feed reel 31 is drawn out. However, in a case where a load torque is not applied to the feed reel 31 and the feed reel 31 rotates freely, a tension is not applied to the multilayer film F. Consequently, the multilayer film F may loosen and be inappropriately fixed. Therefore, a predetermined load torque is applied to the roll-up reel 35 so that an appropriate tension is applied to the multilayer film F. A configuration for applying a predetermined load torque to the roll-up reel 35 will be described.

Figure 4:
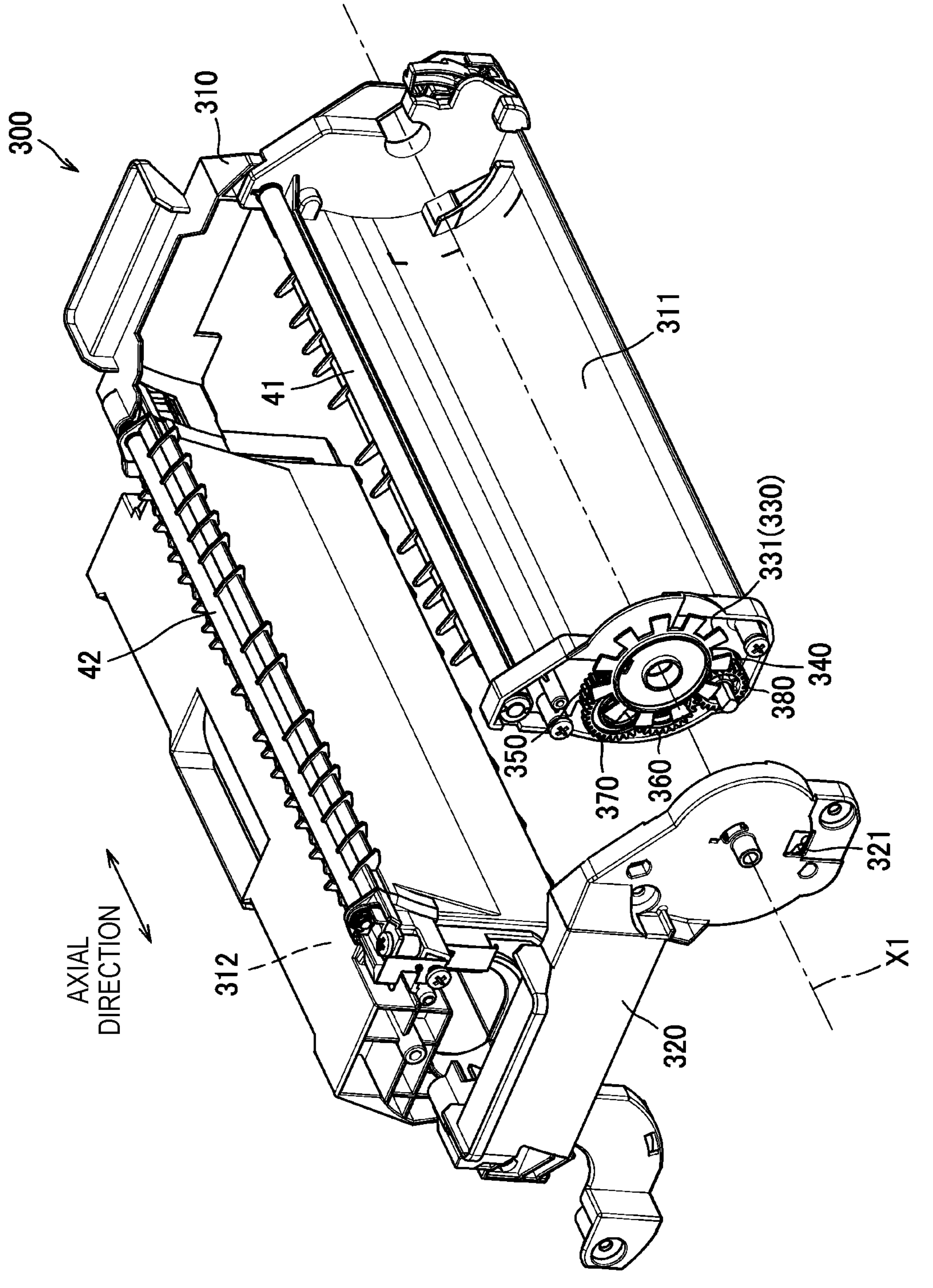
FIG. 4 is an exploded perspective view of the holder with the film cartridge removed.

As shown in FIG. 4, the holder 300 includes a base frame 310, a holder gear cover 320, a rotary encoder 330, a torque applying member 340, an input gear 350, a first idle gear 360, a second idle gear 370, and a third idle gear 380.

Figure 5A:
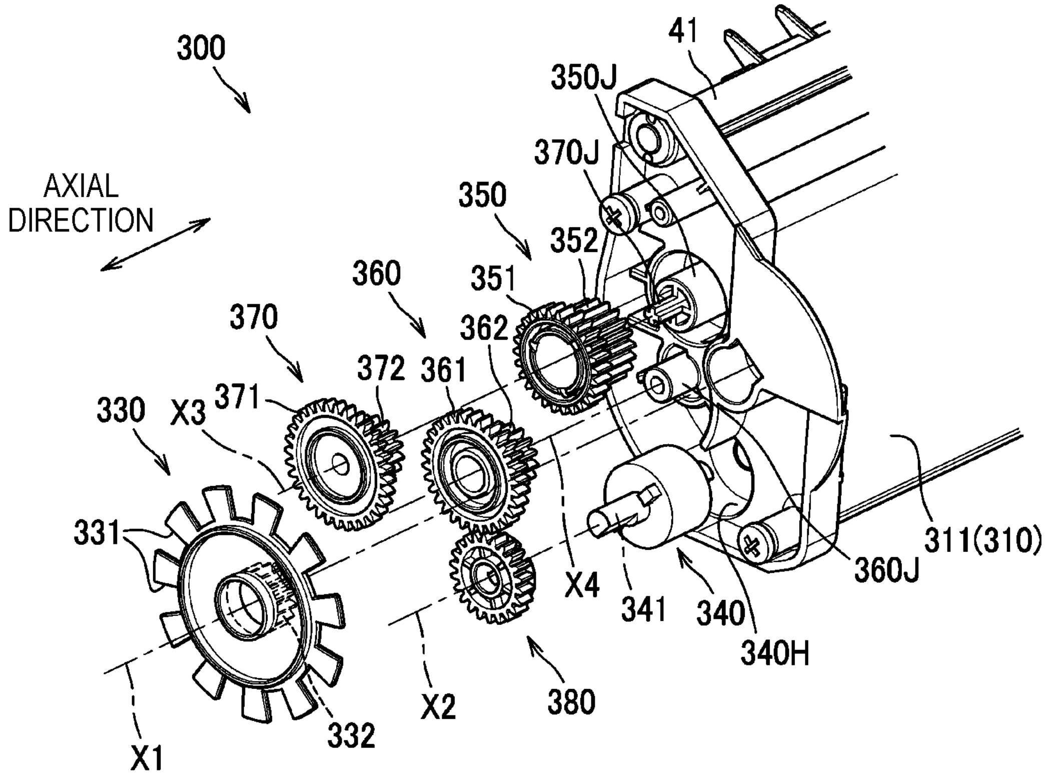
FIG. 5A is an exploded perspective view showing a gear configuration of the holder.

As shown in FIG. 5A, the base frame 310 includes a holding hole 340H that holds the torque applying member 340, a first shaft portion 350J that rotatably supports the input gear 350, a second shaft portion 360J that rotatably supports the first idle gear 360, and a third shaft portion 370J that rotatably supports the second idle gear 370.

Figure 5B:
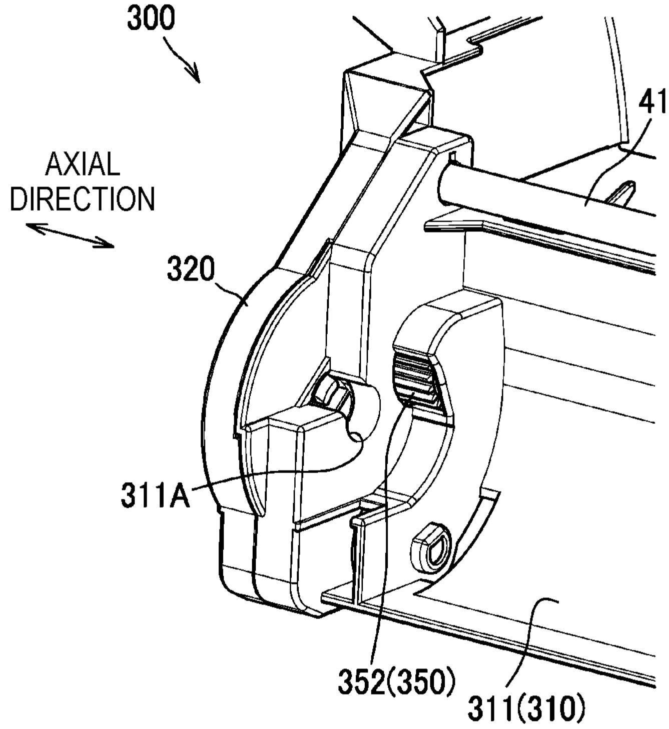
FIG. 5B is a perspective view of the holder as viewed from inside.

As shown in FIG. 4, the base frame 310 is a frame that holds the film cartridge FC. The base frame 310 includes a first holding portion 311 that holds the feed reel 31 and a second holding portion 312 that holds the roll-up reel 35. As shown in FIG. 5B, a groove 311A with which a mounting shaft B10 of the film cartridge FC to be described later is engaged is formed in the first holding portion 311.

Returning to FIG. 4, the holder gear cover 320 is attached to the base frame 310. The holder gear cover 320 is located on one end side of the base frame 310 in the axial direction, and covers the rotary encoder 330, the torque applying member 340, the input gear 350, the first idle gear 360, the second idle gear 370, and the third idle gear 380. The holder gear cover 320 has a detection window 321. The detection window 321 is an opening formed in the holder gear cover 320.

As shown in FIG. 5A, the rotary encoder 330 is an example of a rotational speed detector configured to detect a rotational speed of the input gear 350. The rotary encoder 330 rotates about the first axis X1. The rotary encoder 330 is a rotary plate having a plurality of slits 331 arranged in a circumferential direction and an encoder gear 332. The foil transfer device 1 includes an optical sensor (not shown) located on an inner wall of the housing main body 21 and a control unit (not shown). The optical sensor is a reflective sensor, and may detect the slit 331 of the rotary encoder 330 from the detection window 321. Specifically, in a case where the rotary encoder 330 rotates with rotation of the feed reel 31, the optical sensor detects the number of passages of the slit 331 of the rotary encoder 330 per unit time. The control unit acquires a rotational speed and the number of rotations of the feed reel 31 based on the number of passages of the slit 331 detected by the optical sensor.

The torque applying member 340 applies resistance to rotation of the input gear 350. The torque applying member 340 may be, for example, a torque limiter. The torque applying member 340 includes a fourth shaft portion 341. The fourth shaft portion 341 has a D-cut shaped rotation stopper that engages with the third idle gear 380 in a rotation direction. The fourth shaft portion 341 rotates about a second axis X2 parallel to the first axis X1. The torque applying member 340 generates resistance regardless of whether the fourth shaft portion 341 is rotated in either a forward or reverse direction. Therefore, the torque applying member 340 applies resistance of the same magnitude to the input gear 350 regardless of a rotation direction of the input gear 350.

The input gear 350 is a gear that meshes with an output gear 130 of the cartridge 100 or a second output gear 230 of the second cartridge 200 to be described later, in a case where the film cartridge FC is mounted on the holder 300. The input gear 350 rotates about a third axis X3 parallel to the first axis X1. The input gear 350 includes a large-diameter gear 351 and a small-diameter gear 352 that rotates together with the large-diameter gear 351. As shown in FIG. 5B, the small-diameter gear 352 of the input gear 350 is exposed to a first holding portion 311 side, and meshes with an output gear of the film cartridge FC in a case where the film cartridge FC is mounted on the holder 300.

Returning to FIG. 5A, the first idle gear 360 rotates about a fourth axis X4 parallel to the first axis X1. The first idle gear 360 includes a large-diameter gear 361 and a small-diameter gear 362 that rotates together with the large-diameter gear 361. The small-diameter gear 362 meshes with the large-diameter gear 351 of the input gear 350.

The second idle gear 370 rotates about the third axis X3 parallel to the first axis X1. The second idle gear 370 includes a large-diameter gear 371 and a small-diameter gear 372 that rotates together with the large-diameter gear 371. The small-diameter gear 372 meshes with the large-diameter gear 361 of the first idle gear 360. The large-diameter gear 371 meshes with the encoder gear 332 of the rotary encoder 330.

The third idle gear 380 rotates about the second axis X2 parallel to the first axis X1. The third idle gear 380 meshes with the large-diameter gear 361 of the first idle gear 360. The third idle gear 380 engages with the fourth shaft portion 341 of the torque applying member 340 and rotates together with the fourth shaft portion 341.

In a case where rotation is input to the input gear 350, the encoder gear 332 rotates via the first idle gear 360 and the second idle gear 370. In a case where rotation is input to the input gear 350, the fourth shaft portion 341 of the torque applying member 340 rotates via the first idle gear 360 and the third idle gear 380. In a case where the fourth shaft portion 341 rotates, resistance is applied to the input gear 350 via the third idle gear 380 and the first idle gear 360 by an action of the torque applying member 340.

As described above, on the foil transfer device 1, the cartridge 100 and the second cartridge 200 in which the multilayer films F have different widths may be mounted. In a case where the widths of the multilayer films F are different from each other, in order to make a tension of the multilayer film F acting per unit width constant, it is desirable to apply a load torque corresponding to the width of the multilayer film F. For example, in a case where the first width H1 of the multilayer film F of the cartridge 100 is half the second width H2 of the multilayer film F of the second cartridge 200, if a load torque applied to the output gear 130 of the cartridge 100 is half a load torque applied to the second cartridge 200, the tension of the multilayer film F acting per unit width becomes constant. Here, a configuration in which the load torque applied to the output gear 130 of the cartridge 100 is smaller than the load torque applied to the second output gear 230 of the second cartridge 200 will be described.

As shown in FIG. 7, the second cartridge 200 includes a feed reel case 210, a second feed reel 231, a second roll-up reel 235, and the second output gear 230. The multilayer film F having the second width H2 is rolled around the second feed reel 231. The second feed reel 231 is accommodated in the feed reel case 210. The feed reel case 210 rotatably supports the second feed reel 231. The second roll-up reel 235 rolls up the multilayer film F having the second width H2.

The second output gear 230 is located at an end portion of the second feed reel 231. The second output gear 230 rotates together with the second feed reel 231. The second output gear 230 is partially exposed from the feed reel case 210. In a case where the second cartridge 200 is mounted on the holder 300, the second output gear 230 meshes with the input gear 350 of the holder 300. That is, in a case where the second cartridge 200 is mounted on the holder 300, a load torque is input to the second output gear 230 from the input gear 350 of the holder 300.

The feed reel case 210 includes a mounting shaft B10 at one end in an axial direction. The mounting shaft B10 is a portion that enters the groove 311A of the holder 300 in a case where the second cartridge 200 is held by the holder 300. In a case where the mounting shaft B10 enters the groove 311A, the second cartridge 200 is positioned with respect to the holder 300.

Figure 8A:
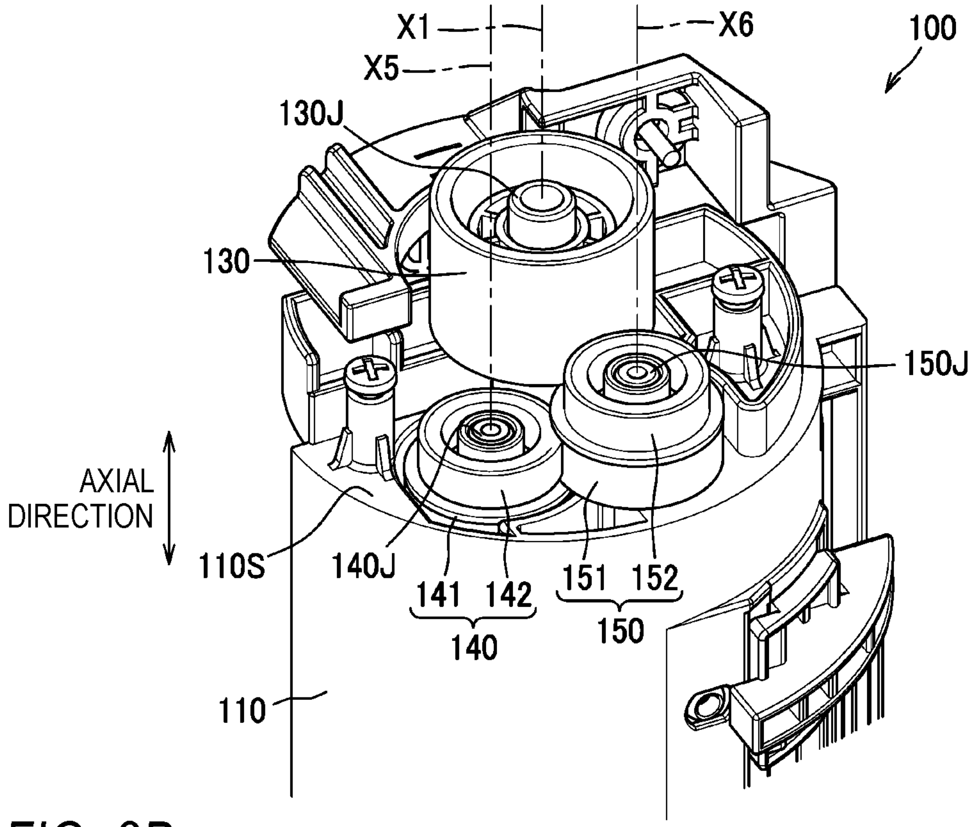
FIGS. 8A and 8B are a perspective view and a cross-sectional view, respectively, showing a gear configuration of the cartridge.
Figure 8B:
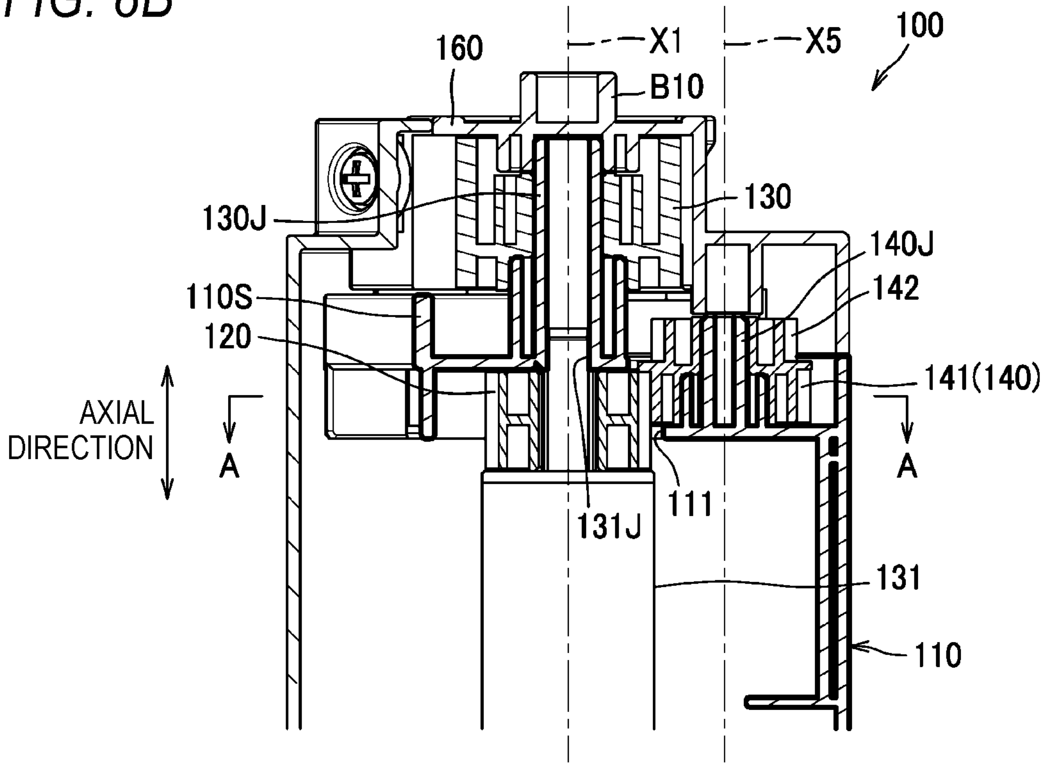

As shown in FIGS. 6, 8A and 8B, the cartridge 100 includes a feed reel case 110, a feed reel 131, a roll-up reel 135, a reel gear 120, the output gear 130, a first intermediate gear 140, a second intermediate gear 150, and a gear cover 160. The first intermediate gear 140 and the second intermediate gear 150 are examples of at least one intermediate gear that reduces rotation speed of the reel gear 120 and transmits the rotation to the output gear 130. In FIG. 8A, the gear cover 160 is omitted.

As shown in FIG. 8B, the multilayer film F having the first width H1 is rolled around the feed reel 131. The roll-up reel 135 is a reel that rolls up the multilayer film F having the first width H1. The feed reel 131 is accommodated in the feed reel case 110. The feed reel case 110 includes a side wall 110S at one end portion in an axial direction. The side wall 110S rotatably supports the feed reel 31. The side wall 110S has a through hole 111. The gear cover 160 is located at an end portion of the feed reel case 110 in the axial direction. The gear cover 160 covers all or a part of the output gear 130, the first intermediate gear 140, and the second intermediate gear 150.

As shown in FIGS. 8A and 8B, the side wall 110S includes a bearing hole 131J that rotatably supports the feed reel 131, a seventh shaft portion 130J that rotatably supports the output gear 130, an eighth shaft portion 140J that rotatably supports the first intermediate gear 140, and a ninth shaft portion 150J that rotatably supports the second intermediate gear 150. The bearing hole 131J is disposed inside the seventh shaft portion 130J coaxially with the seventh shaft portion 130J (on the first axis X1). Therefore, the output gear 130 is rotatable about the first axis X1 together with the reel gear 120.

The feed reel case 110 includes the mounting shaft B10 at one end in the axial direction. The mounting shaft B10 is a portion that enters the groove 311A of the holder 300 in a case where the cartridge 100 is held by the holder 300. In a case where the mounting shaft B10 enters the groove 311A, the cartridge 100 is positioned with respect to the holder 300.

The reel gear 120 is located at an end portion of the feed reel 131 in the axial direction. Specifically, the reel gear 120 is located between the multilayer film F rolled around the feed reel 131 and the output gear 130 in the axial direction. The reel gear 120 rotates together with the feed reel 131. The reel gear 120 rotates about the first axis X1. The reel gear 120 meshes with the first intermediate gear 140.

The output gear 130 is a gear that transmits a rotational force of the feed reel 131 to the holder 300. The output gear 130 rotates about the first axis X1.

In the axial direction, the reel gear 120 is located on one side of the side wall 110S, and the output gear 130 is located on the other side of the side wall 110S. In other words, the output gear 130 is located on a side opposite to the reel gear 120 across the side wall 110S.

The first intermediate gear 140 rotates about a fifth axis X5 parallel to the first axis X1. The first intermediate gear 140 is a reduction gear including a large-diameter gear and a small-diameter gear. Specifically, the first intermediate gear 140 reduces rotation speed of the reel gear 120 and transmits the rotation to the second intermediate gear 150. The first intermediate gear 140 includes a first large-diameter gear 141 that meshes with the reel gear 120, and a first small-diameter gear 142 that rotates together with the first large-diameter gear 141. The first large-diameter gear 141 of the first intermediate gear 140 meshes with the reel gear 120 via the through hole 111.

The second intermediate gear 150 rotates about a sixth axis X6 parallel to the first axis X1. The second intermediate gear 150 is a reduction gear including a large-diameter gear and a small-diameter gear. Specifically, the second intermediate gear 150 reduces rotation speed of the first intermediate gear 140 and transmits the rotation to the output gear 130. The second intermediate gear 150 includes a second large-diameter gear 151 and a second small-diameter gear 152. The second large-diameter gear 151 meshes with the first small-diameter gear 142. The second small-diameter gear 152 rotates together with the second large-diameter gear 151 and meshes with the output gear 130.

In this way, since the reel gear 120 meshes with the first intermediate gear 140, the first intermediate gear 140 meshes with the second intermediate gear 150, and the second intermediate gear 150 meshes with the output gear 130, in a case where the cartridge 100 is mounted on the holder 300, a load torque is input to the reel gear 120 from the input gear 350 of the holder 300 via the first intermediate gear 140, the second intermediate gear 150, and the output gear 130.

Operations of the cartridge 100 and the second cartridge 200 configured as described above will be described.

Figure 9A:
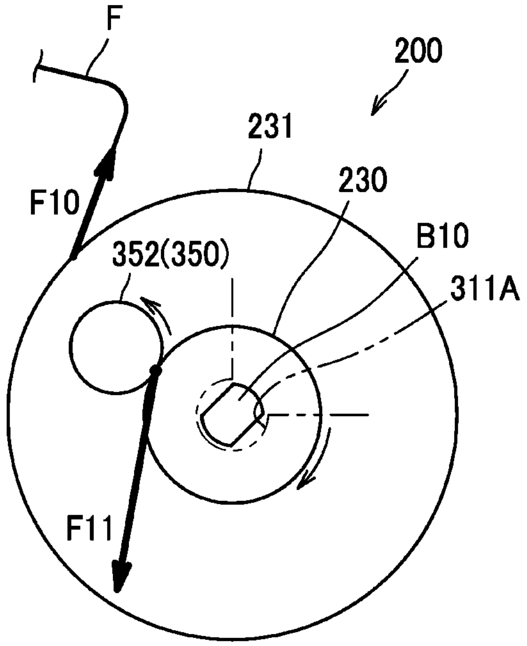
FIG. 9A is a view showing an operation of the second cartridge.

As shown in FIG. 9A, in a case where the second cartridge 200 is mounted on the holder 300, the second output gear 230 meshes with the small-diameter gear 352 of the input gear 350 in the holder 300.

In a case where the foil transfer is performed, since the multilayer film F is pulled, the second output gear 230 rotates clockwise in the drawing together with the second feed reel 231. Then, the small-diameter gear 352 meshing with the second output gear 230 rotates counterclockwise. At this time, a load torque is transmitted from the small-diameter gear 352 to the second output gear 230.

In this case, the second feed reel 231 is pulled upward by a force F10 due to a tension of the multilayer film F. However, since the second output gear 230 receives rotational resistance from the small-diameter gear 352, the second output gear 230 is pushed downward by a force F11. Therefore, the mounting shaft B10 of the second cartridge 200 is less likely to come off from the groove 311A.

Figure 9B:
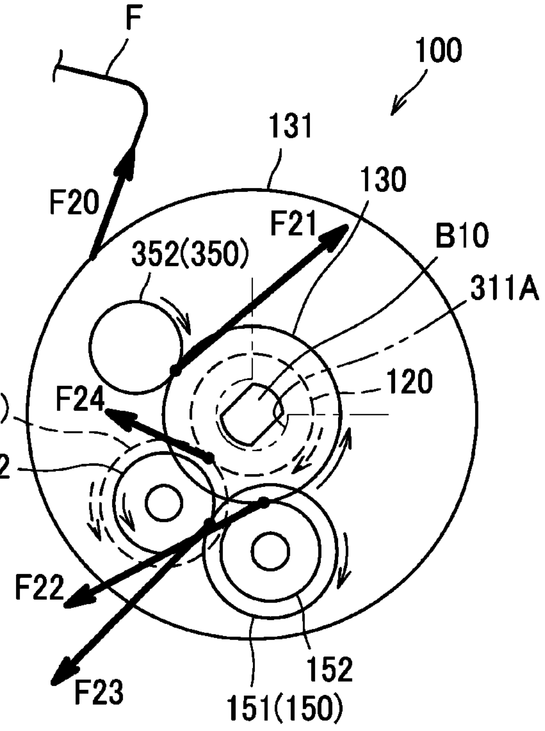
FIG. 9B is a view showing an operation of the cartridge.

As shown in FIG. 9B, in a case where the cartridge 100 is mounted on the holder 300, the output gear 130 meshes with the small-diameter gear 352 of the input gear 350 in the holder 300.

In a case where the foil transfer is performed, since the multilayer film F is pulled, the reel gear 120 rotates clockwise together with the feed reel 131. Then, the first intermediate gear 140 meshing with the reel gear 120 rotates counterclockwise. In a case where the first intermediate gear 140 rotates counterclockwise, the second intermediate gear 150 meshing with the first small-diameter gear 142 of the first intermediate gear 140 rotates clockwise. In a case where the second intermediate gear 150 rotates clockwise, the output gear 130 meshing with the second small-diameter gear 152 of the second intermediate gear 150 rotates counterclockwise. In a case where the output gear 130 rotates, the small-diameter gear 352 of the holder 300 rotates clockwise. In this way, the cartridge 100 rotates the small-diameter gear 352 of the holder 300 in a direction opposite to the second cartridge 200.

At this time, a load torque is transmitted from the small-diameter gear 352 to the output gear 130. A magnitude of the load torque applied from the small-diameter gear 352 to the output gear 130 is the same as a magnitude of a load torque received by the second output gear 230 of the second cartridge 200, although rotation directions are different. However, since the load torque received by the output gear 130 is transmitted to the reel gear 120 via the second intermediate gear 150 and the first intermediate gear 140 that are reduction gears, a load torque received by the feed reel 131 becomes smaller than a load torque received by the second feed reel 231.

In this case, the feed reel 131 is pulled upward by a force F20 due to a tension of the multilayer film F. Since the output gear 130 receives rotational resistance from the small-diameter gear 352, the output gear 130 is pushed upward by a force F21. However, the second intermediate gear 150 receives rotational resistance from the output gear 130 and is pushed leftward in the drawing (F22), the first intermediate gear 140 receives rotational resistance from the second intermediate gear 150 and is pushed leftward in the drawing (F23), and the first intermediate gear 140 is pushed leftward from the reel gear 120 (F24). Since a resultant force of the forces F22 to F24 attempts to rotate the feed reel case 110 clockwise in the drawing, the mounting shaft B10 of the feed reel 131 is less likely to come off from the groove 311A. The forces F22 to F24 received by the respective gears act on the feed reel case 110 via shafts of the respective gears.

Figure 9C:
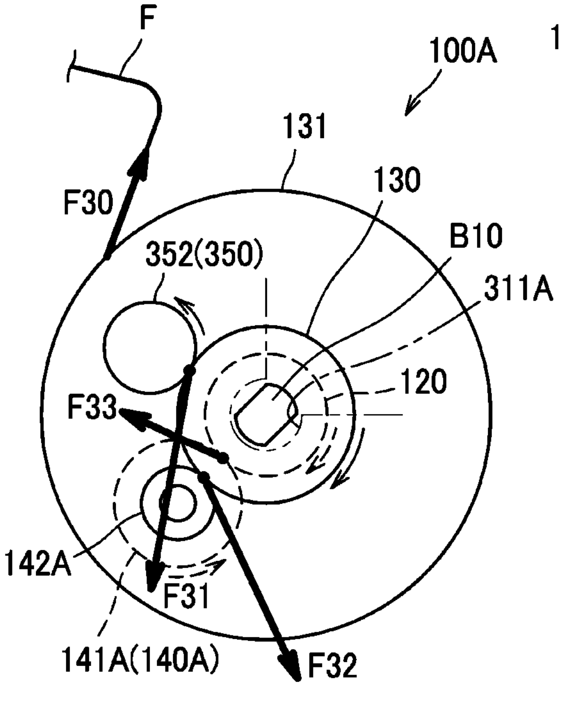
FIG. 9C is a view showing an operation of a cartridge in a case where a second intermediate gear is not disposed.

FIG. 9C is a view showing an operation of a cartridge 100A in which a second intermediate gear is not disposed and one intermediate gear is provided. In this embodiment, since the second intermediate gear is not disposed, a small-diameter gear 142A of a first intermediate gear 140A meshes with the output gear 130. In a case where the reel gear 120 rotates clockwise, the first intermediate gear 140A rotates counterclockwise. In a case where a large-diameter gear 141A of the first intermediate gear 140A rotates counterclockwise, the output gear 130 rotates clockwise since the small-diameter gear 142A of the first intermediate gear 140A meshes with the output gear 130. In this embodiment, the cartridge 100A rotates the small-diameter gear 352 of the holder 300 in a direction the same as that of the second cartridge 200.

At this time, a load torque is transmitted from the small-diameter gear 352 to the output gear 130. Since the load torque received by the output gear 130 is transmitted to the reel gear 120 via the first intermediate gear 140A that is a reduction gear, a load torque received by the feed reel 131 is smaller than a load torque received by the second feed reel 231.

In this case, the feed reel 131 is pulled upward by a force F30 due to a tension of the multilayer film F. Since the output gear 130 receives rotational resistance from the small-diameter gear 352, the output gear 130 is pushed downward by a force F31. Then, the first intermediate gear 140A receives rotational resistance from the output gear 130 and is pushed rightward in the drawing (F32), and the first intermediate gear 140A is pushed leftward from the reel gear 120 (F33). Since the first intermediate gear 140 is a reduction gear, the force F33 is smaller than the force F32. In such an embodiment, since a resultant force of the forces F32 and F33 attempts to rotate the feed reel case 110 counterclockwise in the drawing, the mounting shaft B10 of the feed reel 131 may come off from the groove 311A in some cases. In such a case, the mounting shaft B10 of the feed reel 131 may be adjusted so as not to come off from the groove 311A by changing a direction of an insertion port of the groove 311A or changing a position of the first intermediate gear 140A.

According to the present embodiment described above, the following effects may be obtained.

The holder 300 according to the present embodiment is mounted on the housing main body 21 of the foil transfer device 1 in a state of holding one of the cartridge 100 and the second cartridge 200. In a configuration according to the related art, since a reduction gear is provided at an end portion of a film cartridge in an axial direction, the film cartridge is large in a width direction.

However, according to the cartridge 100 of the present invention, since the first intermediate gear 140 and the second intermediate gear 150 that reduce rotation speed of the reel gear 120 and transmit the rotation to the output gear 130 are provided, the rotation of the reel gear 120 may be reduced according to a film width of the cartridge 100 and transmitted to the output gear 130. Therefore, a rotational load torque input from the output gear 130 may be transmitted to the reel gear 120 in a reduced state. As a result, since a tension acting per unit width of the cartridge 100 is close to a tension acting per unit width of the second cartridge 200, the tension may be within a certain range.

The reel gear 120 is located between the multilayer film F rolled around the feed reel 131 and the output gear 130 in an axial direction. In addition, since the first intermediate gear 140 and the second intermediate gear 150 are disposed in a space that is empty due to a small width of the multilayer film F, the cartridge 100 is not large in a width direction of the multilayer film F.

As shown in FIG. 9B, since the rotation speed of the reel gear 120 is reduced by the two intermediate gears including the first intermediate gear 140 and the second intermediate gear 150, the mounting shaft B10 of the feed reel 131 is less likely to come off from the groove 311A compared to a case where only one intermediate gear is provided (see FIG. 9C).

Since the holder 300 includes the torque applying member 340, resistance may be applied to the output gear 130 of the cartridge 100 from the input gear 350 of the holder 300.

It should be noted that the present invention is not limited to the above-described embodiment, and may be used in various forms as exemplified below.

In the above-described embodiment, the cartridge 100 and the second cartridge 200 may be selectively mounted on the foil transfer device 1, but the present invention is not limited to this configuration, and cartridges other than the cartridge 100 and the second cartridge 200 may be more selectively mounted.

In the above-described embodiment, the first intermediate gear 140 and the second intermediate gear 150 are illustrated as examples of at least one intermediate gear that reduces rotation speed of the reel gear 120 and transmits the rotation to the output gear 130, but the present invention is not limited thereto, and one (see FIG. 9C), or three or more intermediate gears may be provided.

In the above-described embodiment, a device that transfers a foil onto a toner image formed on a sheet has been exemplified as a foil transfer device, but the present invention is not limited thereto, and the foil transfer device may be any device as long as the foil transfer device transfers the foil onto the sheet.

In the above-described embodiment, the multilayer film F includes four layers, but the present invention is not limited thereto, and the number of layers of the multilayer film may be any number as long as the multilayer film includes a transfer layer and a support layer.

The elements described in above-described embodiment and modification may be combined as desired and carried out.

What is claimed is:

1. A cartridge attachable to and detachable from a housing main body of a foil transfer device that disposes a multilayer film including a plurality of layers on a sheet and transfers at least one layer of the multilayer film onto the sheet, the cartridge comprising:

a feed reel around which the multilayer film is rolled and that is configured to rotate about a first axis extending in an axial direction of the feed reel;

a reel gear that is located at an end portion of the feed reel in the axial direction and that is configured to rotate together with the feed reel;

an output gear that is configured to transmit a rotational force applied to the feed reel to outside of the cartridge; and an intermediate gear that reduces rotation speed of the reel gear and transmits the rotation of the reel gear to the output gear, wherein both the output gear and the reel gear rotate about the first axis.

2. The cartridge according to claim 1, wherein the intermediate gear is a first intermediate gear including a first large-diameter gear that meshes with the reel gear and a first small-diameter gear that rotates together with the first large-diameter gear, and the cartridge further comprises a second intermediate gear including a second large-diameter gear that meshes with the first small-diameter gear and a second small-diameter gear that rotates together with the second large-diameter gear and meshes with the output gear.

3. The cartridge according to claim 2, wherein the cartridge includes a side wall that rotatably supports the feed reel, and in the axial direction, the reel gear is located on one side of the side wall, and the output gear is located on the other side of the side wall.

4. The cartridge according to claim 3, wherein the side wall has a through hole, and the first intermediate gear meshes with the reel gear via the through hole.

5. The cartridge according to claim 1, wherein the cartridge is mountable on a holder to be mounted on the housing main body in a state in which the cartridge is held, and the holder includes an input gear that meshes with the output gear in a case where the cartridge is mounted on the holder, and a torque applying member that applies resistance to rotation of the input gear.

6. The cartridge according to claim 5, wherein the holder further includes a rotational speed detector configured to detect a rotational speed of the input gear.

7. The cartridge according to claim 6, wherein the rotational speed detector includes a rotary encoder.

8. The cartridge according to claim 7, wherein the rotary encoder rotates about the first axis.

9. The cartridge according to claim 5 being a first cartridge in which a multilayer film having a first width is rolled around the feed reel, and wherein the first cartridge or a second cartridge including a second feed reel around which a multilayer film having a second width larger than the first width is rolled are mountable on the holder.

10. The cartridge according to claim 9, wherein the second cartridge includes a second output gear that is located at an end portion of the second feed reel and rotates together with the second feed reel, the second output gear meshing with the input gear.

11. A holder configured to hold a cartridge, the cartridge being attachable to and detachable from a housing main body of a foil transfer device that disposes a multilayer film including a plurality of layers on a surface of a sheet on which a toner image is formed and transfers at least one layer of the multilayer film onto the toner image, the cartridge including a feed reel around which the multilayer film is rolled and that rotates about a first axis extending in an axial direction of the feed reel, a reel gear that is located at an end portion of the feed reel in the axial direction and rotates together with the feed reel, an output gear, and at least one intermediate gear that reduces rotation speed of the reel gear and transmits the rotation to the output gear, the holder comprising:

an input gear that meshes with the output gear in a case where the cartridge is attached to the housing main body; and a torque applying member that applies resistance to rotation of the input gear.

12. The holder according to claim 11, further comprising:

a rotational speed detector configured to detect a rotational speed of the input gear.

13. The holder according to claim 12, wherein the rotational speed detector includes a rotary encoder.

14. The holder according to claim 13, wherein the rotary encoder rotates about the first axis.

15. The holder according to claim 11, wherein the cartridge in which the multilayer film having a first width is rolled around the feed reel, or a second cartridge including a second feed reel around which a multilayer film having a second width larger than the first width is rolled, are mountable.

16. The holder according to claim 15, wherein the second cartridge includes a second output gear that is located at an end portion of the second feed reel and rotates together with the second feed reel, the second output gear meshing with the input gear.

17. A cartridge assembly attachable to and detachable from a housing main body of a foil transfer device that disposes a multilayer film including a plurality of layers on a sheet and transfers at least one layer of the multilayer film onto the sheet, the cartridge assembly comprising:

a cartridge including:

a feed reel around which the multilayer film is rolled and that rotates about a first axis extending in an axial direction of the feed reel;

a reel gear that is located at an end portion of the feed reel in the axial direction and rotates together with the feed reel;

an output gear that transmits a rotational force applied to the feed reel to outside of the cartridge; and an intermediate gear that reduces rotation speed of the reel gear and transmits the rotation of the reel gear to the output gear, a holder configured to hold the cartridge and includes:

an input gear that meshes with the output gear in a case where the cartridge is held in the holder; and a torque applying member that applies resistance to rotation of the input gear.

18. A cartridge attachable to and detachable from a housing main body of a foil transfer device that disposes a multilayer film including a plurality of layers on a sheet and transfers at least one layer of the multilayer film onto the sheet, the cartridge comprising:

a feed reel around which the multilayer film is rolled and that is configured to rotate about a first axis extending in an axial direction of the feed reel;

a reel gear that is located at an end portion of the feed reel in the axial direction and that is configured to rotate together with the feed reel;

an output gear that is configured to transmit a rotational force applied to the feed reel to outside of the cartridge; and an intermediate gear that reduces rotation speed of the reel gear and transmits the rotation of the reel gear to the output gear, wherein the intermediate gear is a first intermediate gear including a first large-diameter gear that meshes with the reel gear and a first small-diameter gear that rotates together with the first large-diameter gear, and the cartridge further comprises a second intermediate gear including a second large-diameter gear that meshes with the first small-diameter gear and a second small-diameter gear that rotates together with the second large-diameter gear and meshes with the output gear.

19. A cartridge attachable to and detachable from a housing main body of a foil transfer device that disposes a multilayer film including a plurality of layers on a sheet and transfers at least one layer of the multilayer film onto the sheet, the cartridge comprising:

a feed reel around which the multilayer film is rolled and that is configured to rotate about a first axis extending in an axial direction of the feed reel;

a reel gear that is located at an end portion of the feed reel in the axial direction and that is configured to rotate together with the feed reel;

an output gear that is configured to transmit a rotational force applied to the feed reel to outside of the cartridge; and an intermediate gear that reduces rotation speed of the reel gear and transmits the rotation of the reel gear to the output gear, wherein the cartridge is mountable on a holder to be mounted on the housing main body in a state in which the cartridge is held, and the holder includes an input gear that meshes with the output gear in a case where the cartridge is mounted on the holder, and a torque applying member that applies resistance to rotation of the input gear.

20. A cartridge attachable to and detachable from a housing main body of a foil transfer device that disposes a multilayer film including a plurality of layers on a sheet and transfers at least one layer of the multilayer film onto the sheet, the cartridge comprising:

a feed reel around which the multilayer film is rolled and that is configured to rotate about a first axis extending in an axial direction of the feed reel;

a reel gear that is located at an end portion of the feed reel in the axial direction and that is configured to rotate together with the feed reel;

an output gear that is configured to transmit a rotational force applied to the feed reel to outside of the cartridge; and an intermediate gear that reduces rotation speed of the reel gear and transmits the rotation of the reel gear to the output gear, wherein a projection of the output gear towards the reel gear in the axial direction is overlapped with the reel gear.

* * * * *